United States Patent
Cho et al.

(10) Patent No.: US 9,463,792 B2
(45) Date of Patent: Oct. 11, 2016

(54) METHOD FOR MONITORING TORQUE IN HYBRID ELECTRIC VEHICLE

(71) Applicant: Hyundai Motor Company, Seoul (KR)

(72) Inventors: Jinkuk Cho, Goyang-si (KR); Jae Wang Lee, Hwaseong-si (KR); Kum Lim Choi, Seoul (KR); Kyoung Joo Kim, Yongin-si (KR); Keunseok Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/460,061

(22) Filed: Aug. 14, 2014

(65) Prior Publication Data

US 2015/0166056 A1 Jun. 18, 2015

(30) Foreign Application Priority Data

Dec. 18, 2013 (KR) ........................ 10-2013-0158407

(51) Int. Cl.
- B60W 20/00 (2016.01)
- B60L 3/12 (2006.01)
- B60L 15/20 (2006.01)
- B60W 10/08 (2006.01)

(52) U.S. Cl.
CPC ............. *B60W 20/50* (2013.01); *B60L 3/12* (2013.01); *B60L 15/20* (2013.01); *B60W 10/08* (2013.01); *B60W 2510/083* (2013.01); *B60W 2510/242* (2013.01); *Y02T 10/7258* (2013.01); *Y10S 903/903* (2013.01)

(58) Field of Classification Search
CPC ................... B60W 2050/0079; B60W 20/50; B60W 10/08; B60W 2510/242; B60W 2510/083; B61L 3/127; E05F 15/1669; E05F 15/20; E05Y 2400/40; B60L 15/20; B60L 3/12; Y02T 10/7258; Y10S 903/903
USPC .......................................................... 701/22
See application file for complete search history.

(56) References Cited

U.S. PATENT DOCUMENTS

| | | | | |
|---|---|---|---|---|
| 5,988,307 A * | 11/1999 | Yamada et al. | ............... | 180/243 |
| 6,549,840 B1 * | 4/2003 | Mikami et al. | .................. | 701/69 |
| 6,879,888 B2 * | 4/2005 | Ochiai et al. | ................... | 701/22 |
| 6,988,779 B2 * | 1/2006 | Amanuma et al. | .......... | 303/152 |
| 7,216,943 B2 * | 5/2007 | Nishikawa et al. | .......... | 303/152 |
| 7,240,748 B2 * | 7/2007 | Kira et al. | ................. | 180/65.25 |
| 7,456,509 B2 * | 11/2008 | Gray, Jr. | .................... | 290/40 C |

(Continued)

FOREIGN PATENT DOCUMENTS

| JP | 2005-027468 A | 1/2005 |
|---|---|---|
| KR | 10-0747822 B1 | 8/2007 |

(Continued)

*Primary Examiner* — Jerrah Edwards
*Assistant Examiner* — Majdi Alsomiri
(74) *Attorney, Agent, or Firm* — McDermott Will & Emery LLP

(57) ABSTRACT

A method for monitoring a torque in a hybrid electric vehicle includes calculating an output torque of a motor based on a discharging power of a high voltage battery, a consumption power of a plurality of electric loads, and a motor speed. A first difference value between a motor torque command and the calculated output torque of the motor is calculated. The first difference value is compared with a first reference value. When the first difference value is larger than the first reference value, the hybrid electric vehicle is entered in a fail safe mode.

7 Claims, 4 Drawing Sheets

(56) References Cited

U.S. PATENT DOCUMENTS

2009/0145673 A1* 6/2009 Soliman et al. ............. 180/65.1
2010/0312422 A1* 12/2010 Imaseki ......................... 701/22
2012/0108387 A1* 5/2012 Akebono et al. ............... 477/12

FOREIGN PATENT DOCUMENTS

| KR | 10-2010-0064604 A | 6/2010 |
| KR | 10-2012-0012654 A | 2/2012 |
| KR | 10-2013-0029879 A | 3/2013 |

\* cited by examiner

METHOD FOR MONITORING TORQUE IN HYBRID ELECTRIC VEHICLE

CROSS-REFERENCE TO RELATED APPLICATION

This application claims the benefit of priority to Korean Patent Application No. 10-2013-0158407 filed in the Korean Intellectual Property Office on Dec. 18, 2013, the entire contents of which are incorporated herein by reference.

TECHNICAL FIELD

The present disclosure relates to a hybrid electric vehicle, and more particularly, to a method for monitoring a torque in a hybrid electric vehicle.

BACKGROUND

As is generally known, a hybrid electric vehicle uses an internal combustion engine and a battery power source together. That is, the hybrid electric vehicle efficiently combines and uses power from the internal combustion engine and power of a motor.

The hybrid electric vehicle generally includes the engine, the motor, an engine clutch controlling the power between the engine and the motor, a transmission, a differential gear device, a high voltage battery, an integrated starter & generator (ISG) starting the engine or generating power by an output of the engine, and wheels.

Further, the hybrid electric vehicle may include a hybrid control unit (HCU) controlling the entire operation of the hybrid electric vehicle, an engine control unit (ECU) controlling an operation of the engine, a motor control unit (MCU) controlling an operation of the motor, a transmission control unit (TCU) controlling an operation of the transmission, and a battery control unit (BCU) controlling and managing the high voltage battery.

The engine control unit may be called an engine management system (EMS). The battery control unit may be called a battery management system (BMS). The integrated starter & generator may be called a hybrid starter & generator (HSG).

The hybrid electric vehicle may travel in a driving mode, such as an electric vehicle (EV) mode using only the power of the motor. A hybrid electric vehicle (HEV) mode uses rotation force of the engine as the main power and rotation force of the motor as auxiliary power by engaging or releasing the engine clutch according to acceleration and deceleration intention of a driver depending on an operation of an accelerator pedal and a brake pedal, a vehicle speed, and a state of charge of the battery. A regenerative braking mode collects braking and inertial energy through the power generation of the motor during driving by braking or inertia of the vehicle to charge the collected energy in the high voltage battery.

When the hybrid electric vehicle converts the EV mode into the HEV mode, the engine clutch is engaged after an engine speed and a motor speed synchronize with each other, and as a result, a torque change is not generated during a power transferring process between the engine and the motor which are different power sources to secure drivability.

As such, the hybrid electric vehicle uses both mechanical energy of the engine and electrical energy of the high voltage battery, and uses an optimal operation area of the engine and the motor and collects the energy to the motor during braking, and as a result, fuel efficiency may be improved, and energy may be efficiently used.

In order to drive in a fail safe mode of the hybrid electric vehicle, it is required to determine whether the engine follows an engine torque command or the motor follows a motor torque command. To this end, it is required to know a torque and a speed of the engine and a torque and a speed of the motor.

In the hybrid electric vehicle, since controlling the torque acts as an important factor for improving drivability, a research for the torque control has been conducted.

In general, an engine speed sensor measuring the engine speed and a motor speed sensor measuring the motor speed are mounted in the hybrid electric vehicle, but a torque sensor measuring the engine torque and a torque sensor measuring the motor torque are not installed due to a problem such as costs. Accordingly, in the related art, the engine torque is predicted based on air flowing into the engine and a fuel amount, and the motor torque is predicted based on a voltage and a current input to the motor to control the vehicle according to a prediction value, but there is a problem in that reliability deteriorates.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method for monitoring torque of a hybrid electric vehicle having advantages of controlling driving in a fail safe mode by monitoring each torque of an engine and a motor without an additional torque sensor, or correcting an engine torque map and a motor torque map by using a monitoring value as a learning value.

According to an exemplary embodiment of the present disclosure, a method for monitoring a torque in a hybrid electric vehicle includes calculating an output torque of a motor based on a discharging power of a high voltage battery, a consumption power of a plurality of electric loads, and a motor speed. A first difference value between a motor torque command and the calculated output torque of the motor is calculated. The first difference value is compared with a first reference value. When the first difference value is larger than the first reference value, the hybrid electric vehicle is entered in a fail safe mode.

The method may further include storing the first difference value when the first difference value is smaller than or equal to the first reference value. An average of a set number of stored first difference values is calculated. The average of the first difference values is compared with a second reference value. A motor torque command map is corrected when the average of the first difference values is larger than the second reference value.

The method may further include correcting a motor torque map when the average of the first difference values is larger than the second reference value.

The method may further include calculating an output torque of an engine based on the calculated output torque of the motor when the average of the first difference values is smaller than or equal to the second reference value. A second difference value between an engine torque command and the calculated output torque of the engine is calculated. The second difference value is compared with a third reference value. When the second difference value is larger than the third reference value, the hybrid electric vehicle is entered in the fail safe mode.

The step of calculating the output torque of the engine may include controlling the motor torque command to follow a negative value of the engine torque command while the motor and the engine synchronize with each other. An absolute value of the calculated output torque of the motor is determined as the output torque of the engine when the motor speed and an engine speed converge on a uniform value.

The method may further include storing the second difference value when the second difference value is smaller than or equal to the third reference value. An average of a set number of stored second difference values is calculated. An average of the second difference values is compared with a fourth reference value. The engine torque command map is corrected when the average of the second difference values is larger than the fourth reference value.

The torque monitoring method may further include correcting an engine torque map when the average of the second difference values is larger than the fourth reference value.

The output torque of the motor may be determined by a value calculated from Equation of $$T_{Mot\_Calc} = \frac{P_{Batt} - P_{Load}}{\omega_{Mot}} \times \mu_{Mot} \times \mu_{Inverter}.$$

Wherein, $P_{Batt}$ is the discharging power of the high voltage battery, $P_{Load}$ is the consumption power of the plurality of electric loads, $\omega_{Mot}$ is the speed of the motor, $\mu_{Mot}$ is a discharging efficiency of the motor, and $\mu_{Inverter}$ is a discharging efficiency of an inverter.

As described above, according to the exemplary embodiment of the present disclosure, it is possible to monitor an engine torque and a motor torque without an additional torque sensor and reduce cost.

Further, it is possible to precisely control the engine and the motor by learning the engine torque and the motor torque to correct an engine torque map and a motor torque map.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
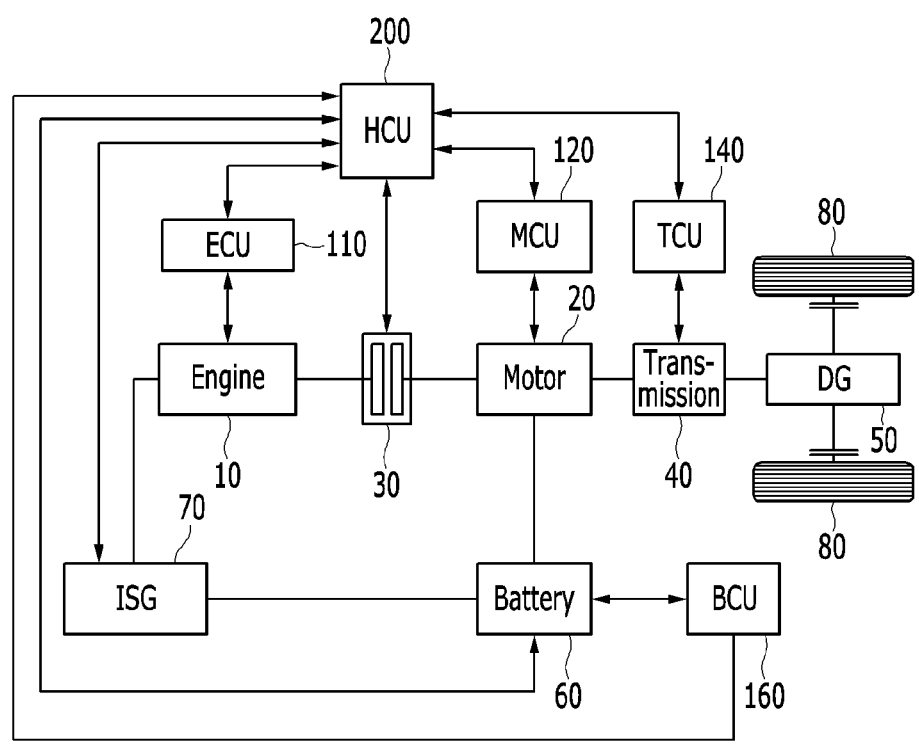
FIG. 1 is a block diagram schematically illustrating a configuration of a hybrid electric vehicle according to an exemplary embodiment of the present disclosure.

FIG. 1 is a block diagram schematically illustrating a configuration of a hybrid electric vehicle according to an exemplary embodiment of the present disclosure.

As illustrated in FIG. 1, a hybrid electric vehicle according to an exemplary embodiment of the present invention includes an engine 10, a motor 20, an engine clutch 30 controlling power between the engine 10 and the motor 20, a transmission 40, a differential gear device 50, a high voltage battery 60, an integrated starter & generator (ISG) 70 starting the engine 10 or generating power by an output of the engine, and a wheel 80.

Further, the hybrid electric vehicle according to an exemplary embodiment of the present invention includes a hybrid control unit (HCU) 200 controlling the entire operation of the hybrid electric vehicle, an engine control unit (ECU) 110 controlling an operation of the engine 10, a motor control unit (MCU) 120 controlling an operation of the motor 20, a transmission control unit (TCU) 140 controlling an operation of the transmission 40, and a battery control unit (BCU) controlling and managing the high voltage battery 60.

Communication between the HCU 200, the ECU 110, the MCU 120, the TCU 140, and the BCU 160 may be implemented by a controller area network (CAN).

Figure 2:
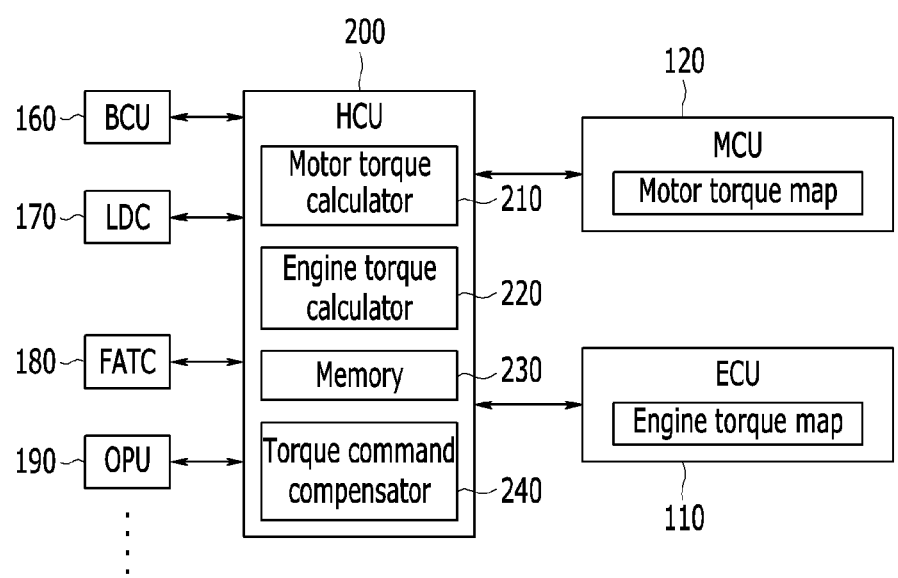
FIG. 2 is a block diagram of a torque monitoring system in a hybrid electric vehicle according to an exemplary embodiment of the present disclosure.

FIG. 2 is a block diagram of a torque monitoring system in a hybrid electric vehicle according to an exemplary embodiment of the present disclosure.

Referring to FIG. 2, the torque monitoring system in the hybrid electric vehicle according to an exemplary embodiment of the present disclosure calculates an output torque of the motor and/or an output torque of the engine, compares the output torques with a motor torque command and/or an engine torque command corresponding thereto, and controls driving in a fail safe mode or correcting a motor torque map and/or an engine torque map.

The torque monitoring system in the hybrid electric vehicle according to an exemplary embodiment of the present disclosure includes a hybrid control unit (HCU) 200, an engine control unit (ECU) 110, and a motor control unit (MCU) 120. The torque monitoring system may further include a battery control unit (BCU) 160, a low voltage DC-DC converter (LDC) 170, a full automatic temperature controller (FATC) 180, an oil pump unit (OPU) 190, and the like.

The ECU 110 controls an output torque of the engine 10 according to an engine torque command applied from the HCU 200. The ECU 110 includes an engine torque map, and an engine target torque corresponding to the engine torque command is stored in the engine torque map.

The MCU 120 controls an output torque of the motor 20 according to a motor torque command applied from the HCU 200. The MCU 120 includes a motor torque map, and a motor target torque corresponding to the motor torque command is stored in the motor torque map. The MCU 120 includes an inverter configured by a plurality of power switches, and the power switches may be configured by any one of an insulated gate bipolar transistor (IGBT), an MOSFET, and a transistor.

The BCU 160 detects an output voltage and an output current of the high voltage battery 60 to transfer signals corresponding to the output voltage and the output current to the HCU 200.

The LDC 170 converts a DC high voltage supplied from the high voltage battery 60 into a DC low voltage to supply the converted DC low voltage to a plurality of electric loads using the DC low voltage as operation power. The LDC 170 detects an input voltage and an input current of the plurality of electric loads using the DC low voltage to transfer signals corresponding to the input voltage and the input current to the HCU 200. The HCU 200 may calculate a consumption power consumed in the plurality of electric loads using the DC low voltage.

The FATC 180 controls driving of an air conditioning device. The FATC 180 detects an input voltage and an input current of the air conditioning device to transfer signals corresponding to the input voltage and the input current to the HCU 200.

The OPU 190 is connected with the TCU 140, and controls driving of an electric oil pump (EOP) (not illustrated) according to information on a state of the transmission 40 received from the TCU 140. The OPU 190 detects an input voltage and an input current of the EOP to transfer signals corresponding to the input voltage and the input current to the HCU 200.

In FIG. 2, as a control unit detecting the consumption power of the plurality of electric loads, only the LDC 170, the FATC 180, and the OPU 190 are illustrated, but the control unit is not limited thereto.

The HCU 200 integrally controls the plurality of control units according to a driving requirement of the driver and a vehicle state to control the output torque of the engine 10 and the output torque of the motor 20, and controls the engine clutch 30 to control driving in an electric vehicle (EV) mode, a hybrid electric vehicle (HEV) mode, and a regenerative braking mode.

The HCU 200 may be implemented by at least one microprocessor operating by a set program, and the program may include a series of commands for executing each step included in a method for monitoring a torque according to an exemplary embodiment of the present disclosure to be described below.

However, the scope of the present disclosure is not necessarily limited thereto. Various modifications different from the configuration of the exemplary embodiment may be included within the scope of the present disclosure. For example, in the method for monitoring the torque according to the exemplary embodiment of the present disclosure to be described below, some processes may be performed by the HCU 200, some other processes may be performed by the ECU 110, and other processes may be performed by the MCU 120.

That is, the ECU 110, the MCU 120, the TCU 140, the BCU 160, the LDC 170, the FATC 180, the OPU 190, and the HCU 200 are separated according to an operational function thereof, but one control unit may manage and control an operation of all constituent elements.

The HCU 200 may include a motor torque calculator 210, an engine torque calculator 220, a memory 230, and a torque command compensator 240.

The motor torque calculator 210 calculates the output torque of the motor 20 based on a discharging power of the high voltage battery 60 and the consumption power of the plurality of electric loads.

The output torque of the motor 20 may be determined by a value calculated by the following Equation.

$$T_{Mot\_Calc} = \frac{P_{Batt} - P_{Load}}{\omega_{Mot}} \times \mu_{Mot} \times \mu_{Inverter}$$

Where, $P_{Batt}$ is the discharging power of the high voltage battery 60, $P_{Load}$ is the consumption power of the plurality of electric loads, $\omega_{Mot}$ is a speed of the motor 20, $\mu_{Mot}$ is a discharging efficiency of the motor 20, and $\mu_{Inverter}$ is a discharging efficiency of the inverter.

The discharging power $P_{Batt}$ of the high voltage battery may be calculated by multiplying an output voltage Vout_batt and an output current Iout_batt of the high voltage battery. The consumption power $P_{Load}$ of the plurality of electric loads may be calculated by adding a consumption power $P_{LDC}$ of the LDC 170 consumed in the plurality of electric loads using the DC low voltage, a consumption power $P_{FATC}$ of the FATC 180 consumed in the air conditioning device, and a consumption power $P_{EOP}$ of the OPU 190 consumed in the EOP.

In this case, the motor torque calculator 210 may not calculate the output torque of the motor 20 in a transient state where the speed of the motor 20 is changed by considering accuracy, but may calculate the output torque of the motor 20 when the speed of the motor 20 is maintained for a set period of time.

The engine torque calculator 220 calculates the output torque of the engine 10 based on the calculated output torque of the motor 20. A process of calculating the output torque of the engine will be described below with reference to FIG. 3.

Figure 3:
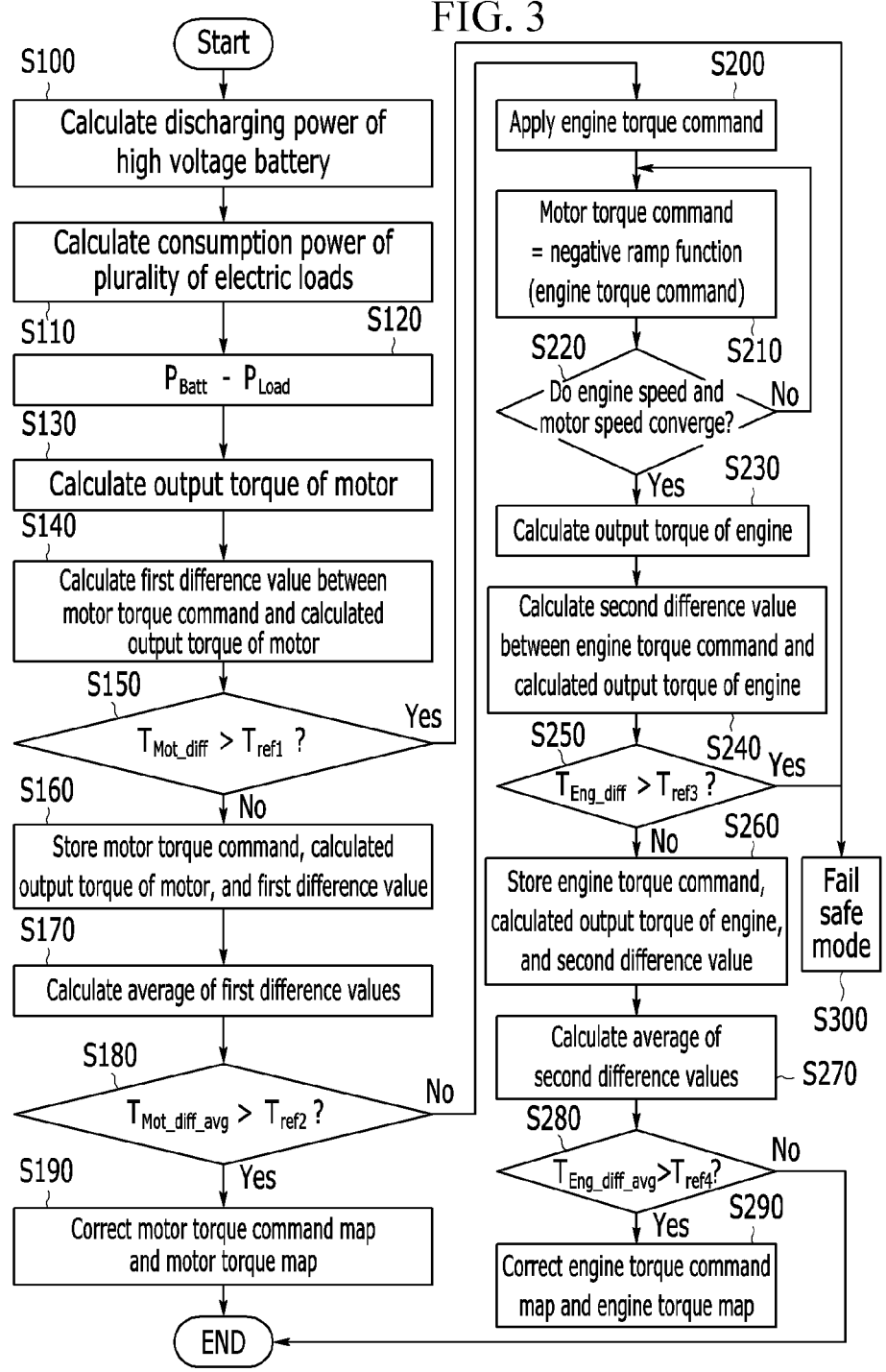
FIG. 3 is a flowchart of a method for monitoring a torque in a hybrid electric vehicle according to an exemplary embodiment of the present disclosure.
Figure 4:
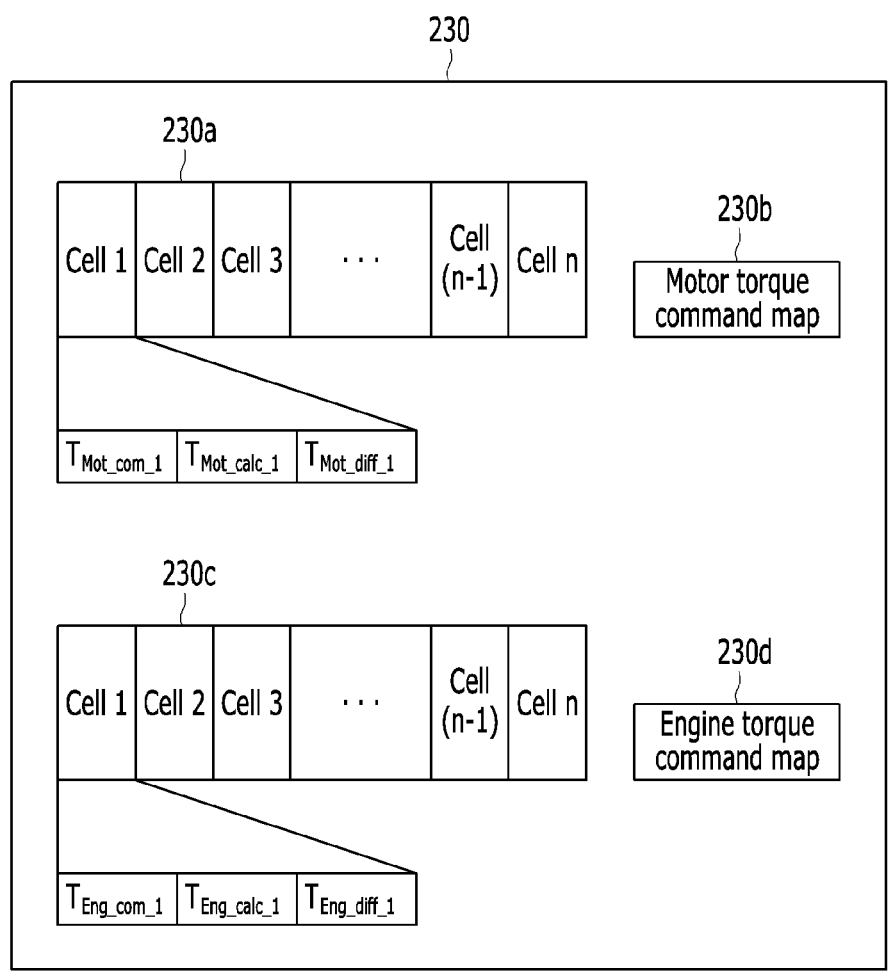
FIG. 4 is a schematic diagram illustrating a data structure of a memory of FIG. 2.

Referring to FIG. 4, the memory 230 includes a first memory 230a as a non-volatile memory, a motor torque command map 230b, a second memory 230c, and an engine torque command map 230d. The first memory 230a and the second memory 230c will be described below with reference to FIGS. 3 and 4.

A motor torque command corresponding to a motor target torque is stored in the motor torque command map 230b. An engine torque command corresponding to an engine target torque is stored in the engine torque command map 230d.

When the torque command compensator 240 determines that compensation of the motor torque command and/or the engine torque command is necessary, by learning the motor output torque and/or the engine output torque, the torque command compensator 240 corrects the motor torque command map 230b and/or the engine torque command map 230d. In this case, the torque command compensator 240 may correct the motor torque map stored in the MCU 120 and/or the engine torque map stored in the ECU 110.

Hereinafter, a method for monitoring a torque in the hybrid electric vehicle will be described in detail with reference to FIGS. 3 and 4.

FIG. 3 is a flowchart of a method for monitoring a torque in a hybrid electric vehicle according to an exemplary embodiment of the present disclosure. FIG. 4 is a schematic diagram illustrating a data structure of a memory of FIG. 2.

Referring to FIG. 3, when the BCU 160 transfers the output voltage Vout_batt and the output current Iout_batt of the high voltage battery 60 to the HCU 200, the HCU 200 calculates the discharging power $P_{Batt}$ of the high voltage battery (S100). The discharging power $P_{Batt}$ of the high voltage battery may be calculated by multiplying the output voltage Vout_batt and the output current Iout_batt of the high voltage battery 60.

The HCU 200 calculates a consumption power $P_{Load}$ of a plurality of electric loads (S110). The consumption power $P_{Load}$ of the plurality of electric loads may be calculated by adding a consumption power $P_{LDC}$ of the LDC 170 consumed in the plurality of electric loads using the DC low voltage, a consumption power $P_{FATC}$ of the FATC 180 consumed in the air conditioning device, and a consumption power $P_{EOP}$ of the OPU 190 consumed in the EOP.

The HCU 200 calculates a difference between the discharging power $P_{Batt}$ of the high voltage battery and the consumption power $P_{Load}$ of the plurality of electric loads (S120).

Thereafter, the HCU 200 calculates an output torque of the motor 20 (S130). The output torque $T_{Mot\_calc}$ of the motor 20 may be determined by the following Equation.

$$T_{Mot\_Calc} = \frac{P_{Batt} - P_{Load}}{\omega_{Mot}} \times \mu_{Mot} \times \mu_{Inverter}$$

Where, $P_{Batt}$ is the discharging power of the high voltage battery 60, $P_{Load}$ is the consumption power of the plurality of electric loads, $\omega_{Mot}$ is the speed of the motor 20, $\alpha_{Mot}$ is the discharging efficiency of the motor 20, and $\mu_{Inverter}$ is the discharging efficiency of the inverter.

The HCU 200 calculates a first difference value $T_{Mot\_diff}$ between a motor torque command $T_{Mot\_com}$ and the calculated output torque $T_{Mot\_calc}$ of the motor (S140).

The HCU 200 compares the first difference value $T_{Mot\_diff}$ with a first reference value $T_{ref1}$ (S150). The first reference value $T_{ref1}$ may be determined through an experiment by those skilled in the art.

In step S150, when the first difference value $T_{Mot\_diff}$ is larger than the first reference value $T_{ref1}$, the HCU 200 enters in a fail safe mode to control the driving (S300).

In step S150, when the first difference value $T_{Mot\_diff}$ is smaller than or equal to the first reference value $T_{ref1}$, the HCU 200 stores the motor torque command $T_{Mot\_com}$, the calculated output torque $T_{Mot\_calc}$ of the motor, and the first difference value $T_{Mot\_diff}$ (S160).

As illustrated in FIG. 4, the first memory 230*a* includes n number of cells. In each cell, the motor torque command $T_{Mot\_com}$, the calculated output torque $T_{Mot\_calc}$ of the motor, and the first difference value $T_{Mot\_diff}$ are stored. That is, in an i-th cell, an i-th motor torque command $T_{Mot\_com\_i}$, an i-th calculated output torque $T_{Mot\_calc\_i}$ of the motor, and an i-th first difference value $T_{Mot\_diff\_i}$ are stored. When an output torque $T_{Mot\_calc\_1}$ of a new motor is calculated, the i-th calculated output torque $T_{Mot\_calc\_i}$ of the motor is newly stored as an i+1-th calculated output torque of the motor, and a previous n-th calculated output torque $T_{Mot\_calc\_n}$ of the motor is deleted. That is, the first memory 230*a* stores only the last n calculated output torques of the motor 20. The motor torque command and the first difference value are also stored in the same way.

The HCU 200 calculates an average $T_{Mot\_diff\_avg}$ of n first difference values (S170).

The HCU 200 compares the average $T_{Mot\_diff\_avg}$ of the first difference values with a second reference value $T_{ref2}$ (S180). The second reference value $T_{ref2}$ may be determined through an experiment by those skilled in the art.

In step S180, when the average $T_{Mot\_diff\_avg}$ of the first difference values is larger than the second reference value $T_{ref2}$, the HCU 200 corrects the motor torque command map 230*b* based on the average $T_{Mot\_diff\_avg}$ of the first difference values (S190). In this case, the HCU 200 may correct the motor torque map stored in the MCU 120. The MCU 120 may control the motor 20 according to the corrected motor torque map.

Accordingly, by learning the output torque of the motor having a characteristic deviation according to deterioration of the hybrid electric vehicle, the motor may be more precisely controlled.

In step S180, when the average $T_{Mot\_diff\_avg}$ of the first difference values is smaller than or equal to the second reference value $T_{ref2}$, the HCU 200 determines that the motor 200 is driven normally, and monitors the output torque of the engine 10.

The HCU 200 applies an engine torque command $T_{Eng\_com}$ to be monitored to the ECU 110 while the motor 20 and the engine 10 synchronize with each other (for example, while the vehicle is in a P stage or an N stage, and the engine clutch 30 is engaged) (S200). When the vehicle is in the P stage or the N stage, the HCU 200 determines that the hybrid electric vehicle is not driven, that is, the driving is not influenced even though the learning progresses to monitor the engine torque.

The HCU 200 controls the motor torque command $T_{Mot\_com}$ to follow a negative value of the engine torque command $T_{Eng\_com}$ (S210). That is, when an absolute value of the motor torque command $T_{Mot\_com}$ is increased up to a point where a sum of the output torques of the engine 10 and the motor 20 becomes 0, the engine speed and the motor speed are increased and then converge on a uniform value.

When the engine speed and the motor speed converge on the uniform value (S220), the HCU 200 calculates the output torque of the engine (S230). That is, the HCU 200 calculates the output torque $T_{Mot\_calc}$ of the motor, and determines the absolute value of the calculated output torque $T_{Mot\_calc}$ of the motor as the output torque $T_{Eng\_calc}$ of the engine.

The HCU 200 calculates a second difference value $T_{Eng\_diff}$ between the engine torque command $T_{Eng\_com}$ and the calculated output torque $T_{Eng\_calc}$ of the engine (S240).

The HCU 200 compares the second difference value $T_{Eng\_diff}$ with a predetermined third reference value $T_{ref3}$ (S250). The third reference value $T_{ref3}$ may be determined through an experiment by those skilled in the art.

In step S250, when the second difference value $T_{Eng\_diff}$ is larger than the third reference value $T_{ref3}$, the HCU 200 enters in the fail safe mode to control the driving of the hybrid electric vehicle (S300).

In step S250, when the second difference value $T_{Eng\_diff}$ is smaller than or equal to the third reference value $T_{ref3}$, the HCU 200 stores the engine torque command $T_{Eng\_com}$, the calculated output torque $T_{Eng\_calc}$ of the engine, and the second difference value $T_{Eng\_diff}$ (S260).

As illustrated in FIG. 4, the second memory 230*c* includes n number of cells. In each cell, the engine torque command $T_{Eng\_com}$, the calculated output torque $T_{Eng\_calc}$ of the engine, and the second difference value $T_{Eng\_diff}$ are stored. That is, in an i-th cell, an i-th engine torque command $T_{Eng\_com\_i}$, an i-th calculated output torque $T_{Eng\_calc\_i}$ of the engine, and an i-th second difference value $T_{Eng\_diff\_i}$ are stored. When an output torque $T_{Eng\_calc\_1}$ of a new engine is calculated, the i-th calculated output torque $T_{Eng\_calc\_i}$ of the engine is newly stored as an i+1-th calculated output torque of the engine, and a previous n-th calculated output torque $T_{Eng\_calc\_n}$ of an engine is deleted. That is, the second memory 230*c* always stores only the last n output torques of the engine. The engine torque command and the second difference value are also stored in the same way.

The HCU 200 calculates an average $T_{Eng\_diff\_avg}$ of n second difference values (S270).

The HCU 200 compares the average $T_{Eng\_diff\_avg}$ of second difference values with a fourth reference value $T_{ref4}$ (S280). The fourth reference value $T_{ref4}$ may be determined through an experiment by those skilled in the art.

In step S280, when the average $T_{Eng\_diff\_avg}$ of the second difference values is larger than the fourth reference value $T_{ref4}$, the HCU 200 corrects the engine torque command map 230d based on the average $T_{Eng\_diff\_avg}$ of the second difference values (S290). In this case, the HCU 200 may correct the engine torque map stored in the ECU 110. The ECU 110 may control the engine 10 according to the corrected engine torque map.

Accordingly, by learning the output torque of the engine having a characteristic deviation according to deterioration of the hybrid electric vehicle, the engine may be more precisely controlled.

In step S200, when the average $T_{Eng\_diff\_avg}$ of the second difference values is smaller than or equal to the fourth reference value $T_{ref4}$, the HCU 200 may determine that the engine 10 is driven normally.

As described above, according to the exemplary embodiment of the present disclosure, it is possible to monitor an engine torque and a motor torque without an additional torque sensor and reduce the cost.

Further, it is possible to precisely control the engine and the motor by learning the engine torque and the motor torque to correct an engine torque command map and a motor torque command map.

While this disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A method for monitoring a torque in a hybrid electric vehicle, the method comprising steps of:
    calculating an output torque of a motor based on a discharging power of a high voltage battery, a consumption power of a plurality of electric loads, and a motor speed;
    calculating a first difference value between a motor torque command and the calculated output torque of the motor;
    comparing the first difference value with a first reference value; and
    entering in a fail safe mode when the first difference value is larger than the first reference value,
    wherein the output torque of the motor is controlled by a motor control unit (MCU) which includes an inverter, and
    wherein the output torque of the motor is determined by a value calculated from Equation of:

$$T_{Mot\_Calc} = \frac{P_{Batt} - P_{Load}}{\omega_{Mot}} \times \mu_{Mot} \times \mu_{Inverter},$$

wherein $P_{Batt}$ is the discharging power of the high voltage battery, $P_{Load}$ is the consumption power of the plurality of electric loads, $\omega_{Mot}$ is the motor speed, $\mu_{Mot}$ is a discharging efficiency of the motor, and $\mu_{Inverter}$ is a discharging efficiency of the inverter.

2. The method of claim 1, further comprising steps of:
    storing the first difference value when the first difference value is smaller than or equal to the first reference value;
    calculating an average of a set number of stored first difference values;
    comparing the average of the first difference values with a second reference value; and
    correcting a motor torque command map when the average of the first difference values is larger than the second reference value.

3. The method of claim 2, further comprising a step of:
    correcting a motor torque map when the average of the first difference values is larger than the second reference value.

4. The method of claim 2, further comprising steps of:
    calculating an output torque of an engine based on the calculated output torque of the motor when the average of the first difference values is smaller than or equal to the second reference value;
    calculating a second difference value between an engine torque command and the calculated output torque of the engine;
    comparing the second difference value with a third reference value; and
    entering in the fail safe mode when the second difference value is larger than the third reference value.

5. The method of claim 4, wherein
    the step of calculating the output torque of the engine includes steps of:
    controlling the motor torque command to follow a negative value of the engine torque command while the motor and the engine synchronize with each other; and
    determining an absolute value of the calculated output torque of the motor as the output torque of the engine when the motor speed and an engine speed converge on a uniform value.

6. The method of claim 4, further comprising steps of:
    storing the second difference value when the second difference value is smaller than or equal to the third reference value;
    calculating an average of a set number of stored second difference values;
    comparing the average of the second difference values with a fourth reference value; and
    correcting an engine torque command map when the average of the second difference values is larger than the fourth reference value.

7. The method of claim 6, further comprising a step of:
    correcting an engine torque map when the average of the second difference values is larger than the fourth reference value.

* * * * *